United States Patent [19]

Nishikawa et al.

[11] Patent Number: 4,990,742
[45] Date of Patent: Feb. 5, 1991

[54] METHOD OF MAKING LAMINATED FILM CAPACITORS

[75] Inventors: Yukio Nishikawa, Ikeda; Yuji Uesugi, Osaka; Kunio Oshima, Matsue; Shinichi Suzawa, Shimane, all of Japan

[73] Assignee: Matsushita Electric Industrial Co., Ltd., Osaka, Japan

[21] Appl. No.: 436,786

[22] Filed: Nov. 15, 1989

[30] Foreign Application Priority Data

Nov. 15, 1988 [JP] Japan .................................. 63-287991

[51] Int. Cl.$^5$ ............................................ B23K 26/00
[52] U.S. Cl. ............................ 219/121.69; 219/121.68
[58] Field of Search ...................... 219/121.68, 121.69; 156/643

[56] References Cited

U.S. PATENT DOCUMENTS 4,417,124 11/1983 Benedite et al. ................ 219/121.68
4,909,818 3/1990 Jones .......................... 219/121.68 X Primary Examiner—C. L. Albritton
Attorney, Agent, or Firm—Wenderoth, Lind & Ponack

[57] ABSTRACT

A method of making a laminated film capacitor comprising a plurality of dielectric layers and a corresponding number of film electrodes which are alternately laminated one above the other with peripheral edges of both of the dielectric layers and film electrodes being exposed to the outside of the capacitor through a peripheral cut side face defined in such capacitor. Each of the dielectric layers is made of material having a lower UV laser beam absorptivity than that of material for each of the film electrodes. A UV laser beam is radiated to the peripheral cut side face to preferentially remove the peripheral edges of the film electrodes which are situated adjacent to the peripheral cut side face of the capacitor.

4 Claims, 2 Drawing Sheets

METHOD OF MAKING LAMINATED FILM CAPACITORS

BACKGROUND OF THE INVENTION

1. Field of the Invention

The present invention relates to a method of making a laminated film capacitor.

2. Description of the Prior Art

A laminated film capacitor utilizing a metalized film as a dielectric member is well known in the art. The conventional laminated film capacitor has some drawbacks in that, since peripheral edges of electrodes in a capacitor are exposed to the outside through cut faces of the capacitor chip, a deviation in insulation resistance is relatively large, discharge is apt to occur from the exposed peripheral edges of the electrodes, and a relatively large amount of laminated film capacitors tends to be found as defective during a moistureproofing test.

In order to substantially eliminate these drawbacks inherent in the laminated film capacitor, the Japanese Patent Publication No. 63-36131 discloses a technique in which a YAG laser beam or a $CO_2$ laser beam is radiated to the cut face of the laminated film capacitor to remove deposited metal exposed through the cut face or to remove the deposited metal and, at the same time, to fushion-bond portions of the dielectric members adjacent the cut face of the capacitor.

However, since the prior art technique disclosed in the above mentioned publication makes use of a thermal process in which an infrared laser is employed, it has been found that the removal of the deposited metal and/or the fushion-bonding of the dielectric members is accompanied by elevation of a temperature to such an extent as to result in a shortcircuiting between capacitor elements with the consequence that not only does the operating characteristic of the capacitor as a whole tend to be lowered consequently, but also the processing condition is considerably limited.

SUMMARY OF THE INVENTIION

The present invention has been devised with a view to substantially eliminating the above discussed problems inherent in the prior art method of making the laminated film capacitor of a type wherein dielectric members made of organic material and electrodes are alternately laminated one above the other, which method is effective to provide the laminated film capacitor having an excellent insulation resistance.

In accordance with the present invention, to this end, there is provided a method of making the laminated film capacitor comprising a plurality of dielectric layers and a corresponding number of film electrodes which are alternately laminated one above the other with peripheral edges of both of the dielectric layers and film electrodes being exposed to the outside of the capacitor through a peripheral cut side face defined in such capacitor. Each of the dielectric layers is made of material having a lower UV laser beam absorptivity than that of material for each of the film electrodes. A UV laser beam is applied to the peripheral cut side face to preferentially remove the peripheral edges of the film electrodes which are situated adjacent to the peripheral cut side face of the capacitor.

Preferably, the UV laser beam employed in the practice of the method of the present invention may have a wavelength not higher than 0.4 $\mu$m. Also, preferably, the UV laser beam may be either an excimer laser beam or a pulsated UV laser beam.

According to the present invention, since the film electrodes are made of material having a higher UV laser beam absorptivity than that of material for the dielectric layers, the peripheral edges of the film electrodes exposed to the outside through the peripheral cut side face of the capacitor are, when radiated with the UV laser beam, subjected to a quantum cutting and, therefore, the peripheral edge portions of the film electrodes can be perferentially removed by means of a low thermal process without the dielectric layers being thermally adversely affected and, hence, with the insulation resistance improved consequently.

BRIEF DESCRIPTION OF THE DRAWINGS

This and other objects and features of the present invention will become clear from the following description taken in conjunction with a preferred embodiment thereof with reference to the accompanying drawings, in which.

DETAILED DESCRIPTION OF THE EMBODIMENT

Hereinafter, a method of making the laminated film capacitor according to the present invention will be described in detail in connection with a preferred embodiment thereof shown in the accompanying drawings.

Figure 1:
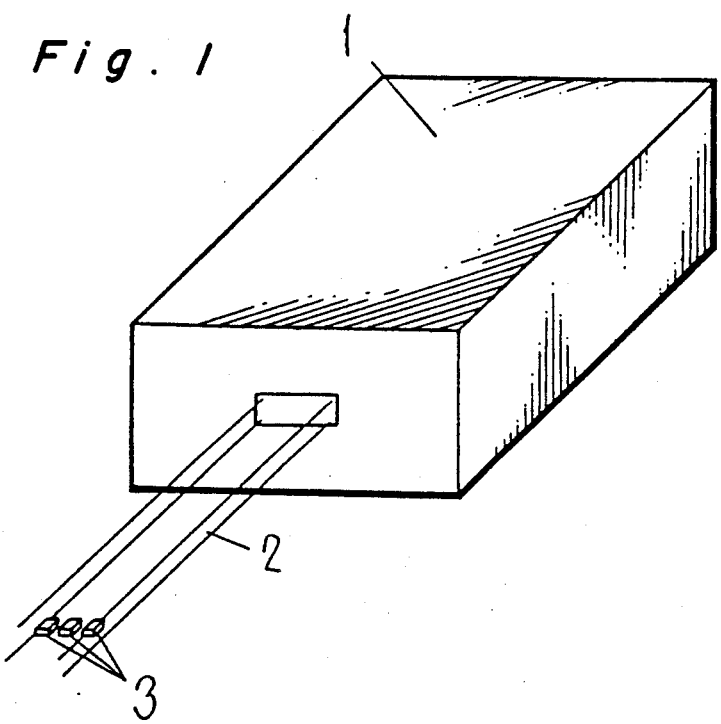
FIG. 1 is a schematic diagram showing a system of making a laminated film capacitor according to an embodiment of the present invention.

Referring first to FIG. 1, reference numeral 1 represents an excimer laser oscillator; reference numeral 2 represents a laser beam emitted from the excimer laser oscillator 1; and reference number 3 represents each of laminated film capacitors. The laminated film capacitors 3 are positioned within the path of travel of the laser beam 2 so that the laser beam 2 can be radiated to at least one cut side face of each capacitor 3 adjacent end faces of the respective capacitor 3 from which associated lead lines are drawn outwards. The laser beam 2 has a cross-sectional area of 25 mm × 7 mm and, therefore, the plural laminated film capacitors 3 can be disposed within the path of travel of the laser beam 2 for processing them at a time.

Figure 2:
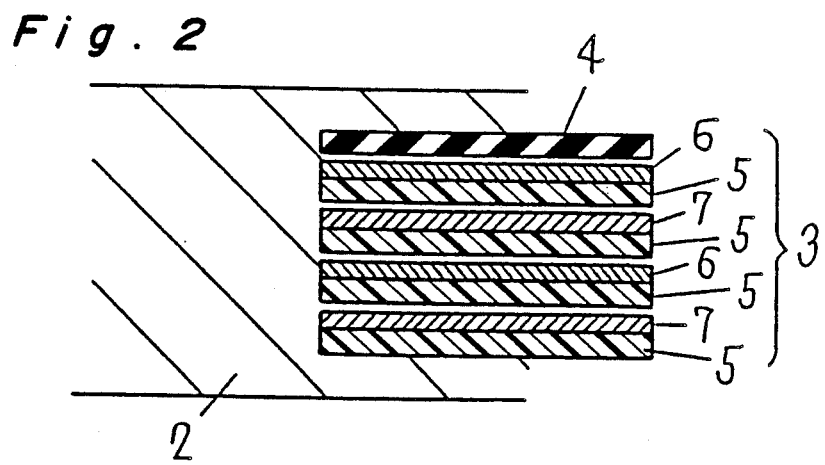
FIGS. 2 and 3 are schematic side sectional views showing the respective capacitors being processed and after having been processed, respectively.

FIG. 2 illustrate one of the laminated film capacitors 3 in sectional representation taken in a direction perpendicular to the cut side face thereof to which the laser beam 2 has been described as radiated. As shown in FIG. 2, the respective laminated film capacitor 3 comprises a top insulating film 4, a plurality of dielectric layers 5 each having a thickness of 4 $\mu$m and made of polypropylene and film electrodes 6 and 7 of different polarity made of aluminum and having a thickness of about 400 angstroms, said electrodes 6 and 7 being alternating with each other with the intervention of the dielectric layers 5. When the laser beam 2 is a KrF laser beacm of 248 nm in wavelength, each of the dielectric layers 5 exhibits a laser beam absorptivity of about 17% and each of the electrodes 6 and 7 exhibits a laser beam absorptivity of about 25%. The coupling energy such as C—C, C—H, etc., of each of the dielectric layers 5 is about 80 to 100 kcal/mol and the coupling energy of aluminum is 55 kcal/mol. Accordingly, in the event that the laser beam 2 is radiated uniformly all over the cut side face of the respective laminated film capacitor 3, peripheral edge portions of the electrodes 6 and 7 can be processed, i.e., removed, preferentially of neighboring peripheral edge portions of the dielectric layers 5.

Figure 3:
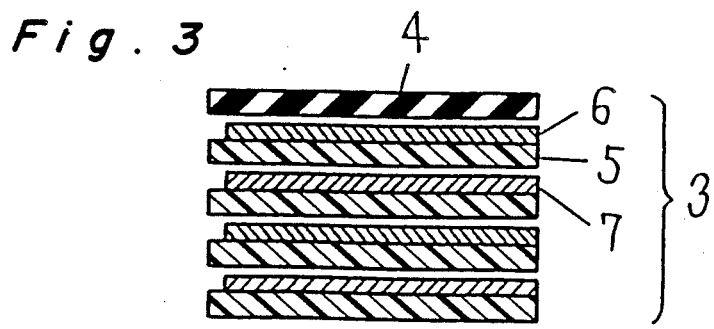

FIG. 3 illustrates the laminated film capacitor 3 having been processed. In FIG. 3, since the peripheral edge portions of the respective electrodes 6 and 7 have been preferentially removed, the electrodes 6 and 7 are set back inwardly relative to the dielectric layers 5.

In the practice of the method according to the preferred embodiment of the present invention, reference has been made to the use of the excimer laser oscillator which can emit the laser beam of high photon energy and which can therefore provide the laser beam effective to remove the peripheral edge portions of the electrodes 6 and 7 even without being converged into a minute spot. Also, since it is a process in which a quantum cutting based on the ultraviolet laser beam is utilized, the temperature would not increase undesirably and will therefore bring no substantial adverse influence on the surroundings. Moreover, since the laser beam 2 is emitted in a pulsated fashion, any possible thermal influence it may bring about on the capacitor can be minimized, rendering the process easy to control.

It is to be noted that, where the wavelength is not greater than 0.4 μm, any other laser than the excimer laser may be employed in the practice of the method of the present invention. Also, the type of material for each of the dielectric layers and the electrodes may not be always limited to that enumerated hereinbefore.

Figure 4:
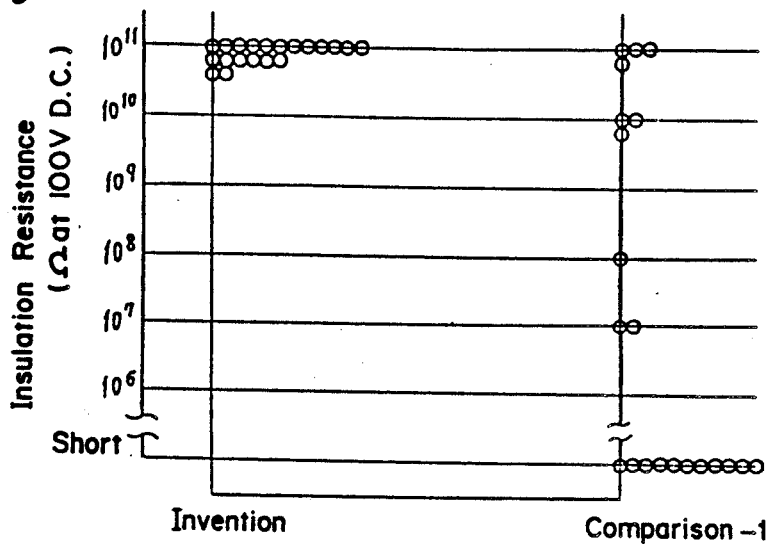
FIG. 4 is a graph showing the insulation resistance of the capacitor.

Insulation resistance values exhibited by the laminated film capacitors manufactured according to the present invention are shown in the graph of FIG. 4, along with those exhibited by conventional laminated film capacitors (Comparison-1) which were manufactured in a similar manner, but with the use of the YAG laser beam. As shown therein, some of the conventional laminated film capacitors have exhibited the insulation resistance not higher than $1 \times 10^6$ Ω at which shortcircuiting has occurred.

As can be understood from the graph of FIG. 4, the laminated film capacitors manufactured according to the present invention exhibit a relatively high insulation resistance with minimized deviation among them. This is illustrative of the fact that the method of the present invention is effective to provide a high reproducibility and, hence, a high yield.

Figure 5:
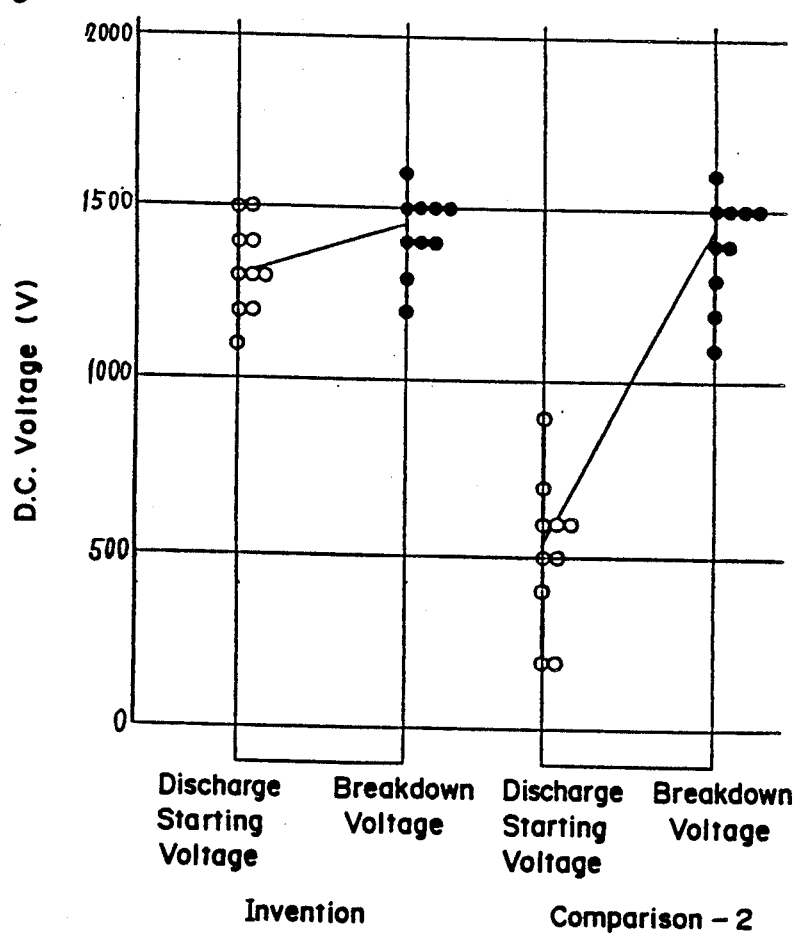
FIG. 5 is a graph showing the relationship between the applied voltage and any one of the voltage at which discharge starts at the cut side face of the capacitor and the breakdown voltage.

The laminated film capacitors manufactured by the method of the present invention and similar laminated film capacitors (Comparison-2) each manufactured with no laser beam radiated to the cut side face were tested as to the voltage breakdown characteristic with the application of a direct current voltage, results of which are shown in the graph of FIG. 5. As shown therein, each of the laminated film capacitors manufactured according to the method of the present invention exhibits a relatively high voltage at which discharge occurs from the cut side face of the respective laminated film capacitor, which voltage substantially approaches a breakdown voltage. This appears to have resulted from the fact that, since the peripheral edge portions of the electrodes are set back inwardly of the cut side face of the respective laminated film capacitor as shown in FIG. 3, the discharge at the cut side face is hard to occur.

From the foregoing full description of the present invention, it has now become clear that the method herein provided comprises the step of radiating a UV laser beam to the cut side face of the laminated film capacitor, which comprises a plurality of dielectric layers and a corresponding number of film electrodes which are alternately laminated one above the other with peripheral edges of both of the dielectric layers and film electrodes being exposed to the outside of the capacitor through the peripheral cut side face defined in such capacitor, thereby to remove the peripheral edge portions of the electrodes. In this instance, each of the dielectric layers is made of material having a lower UV laser beam absorptivity than that of material for each of the film electrodes. Accordingly, the method of the present invention is effective to provide, at a high yield, the flaminated film capacitors which altogether exhibit a minimized deviation in insulation resistance thereof and which are less susceptible to discharge at the cut side face while exhibiting an increased moistureproof.

Although the present invention has been described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A method of making a laminated film capacitor comprising a plurality of dielectric layers and a corresponding number of film electrodes which are alternately laminated one above the other with peripheral edges of both of the dielectric layers and film electrodes being exposed to the outside of the capacitor through a peripheral cut side face defined in such capacitor, each of the dielectric layers being made of material having a lower UV laser beam absorptivity than that of material for each of the film electrodes, which method comprises a step of radiating a UV laser beam to the peripheral cut side face to preferentially remove the peripheral edges of the film electrodes which are situated adjacent to the peripheral cut side face of the capacitor.

2. The method as claimed in claim 1, wherein the UV laser beam has a wavelength not higher than 0.4 μm.

3. The method as claimed in claim 1, wherein the UV laser beam is an excimer laser beam.

4. The method as claimed in claim 1, wherein the UV laser beam is a pulsated UV laser beam.

* * * * *